United States Patent Office 3,230,170
Patented Jan. 18, 1966

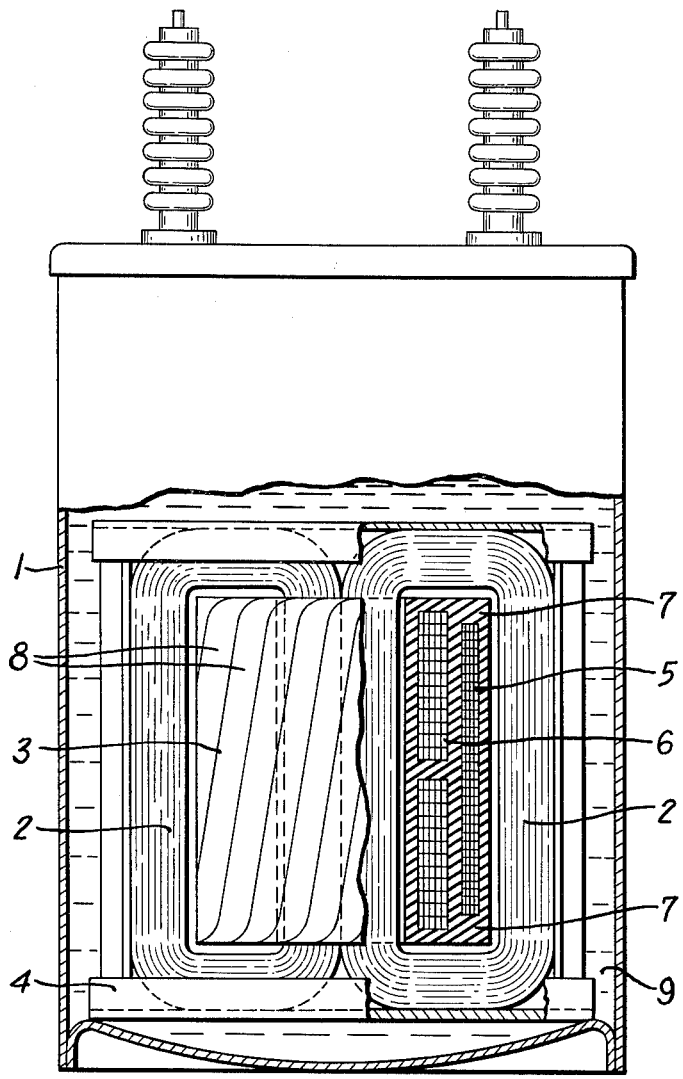

3,230,170
CELLULOSE INSULATING MATERIAL HAVING IMPROVED THERMAL STABILITY
Berthal D. Brummet, Sparta, and Fred S. Sadler, East Orange, N.J., assignors to McGraw-Edison Company, Milwaukee, Wis., a corporation of Delaware
Filed Mar. 17, 1964, Ser. No. 352,530
3 Claims. (Cl. 252—63.2)

This invention relates to cellulosic materials having improved thermal stability and more particularly to cellulosic materials to be used as insulation in electrical apparatus.

Cellulose fibers tend to deteriorate when subjected to elevated temperatures for extended periods of time. This presents a very serious problem with respect to many applications of cellulosic materials. For example, the problem is encountered in using cellulose fiber cord type reinforcing in rubber articles, such as pneumatic tires, steam hoses, conveyor belts and the like. It is also encountered in electrical apparatus employing cellulose insulation materials.

Cellulose fiber reinforced rubber articles are subjected to elevated temperatures in normal use, either from external heat, or from heat which is generated internally by reason of repeated rapid flexing, as in the case of pneumatic tires. The resultant deterioration of the reinforcing fibers is evidenced by a progressive reduction in their strength until eventually they fracture. This constitutes a principal cause of failure of such articles as pneumatic tires and steam hose.

Cellulose insulation materials which are used extensively in electrical apparatus are also subjected to elevated temperatures in use. Here, however, the deterioration problem is increased by other factors, particularly where the insulation materials are in contact with, or immersed in, liquid dielectrics such as transformer oils. The elevated temperatures may cause the liquid dielectrics to break down into their chemical constituents, and the resultant deterioration products may in turn attack the cellulose insulation materials.

The present invention is directed to a cellulose fiber material impregnated with the combination of morpholine and pentaerythritol. This combination of ingredients increases the thermal stability of the cellulose fibers and enables the fibers to withstand deterioration by the action of heat over extended periods of time. The fibers are not only protected against thermal deterioration but are also stabilized against attack from decomposition products of transformer oil or other liquid dielectrics. For this reason, the cellulose material treated in accordance with the invention is particularly useful in oil filled transformers or other similar electrical apparatus. As a further advantage, the cellulose insulating material of the invention will not discolor the transformer oil or other liquid dielectric.

Other objects and advantages will appear in the course of the following description.

The drawing is a sectional view of a transformer embodying cellulose insulation which has been treated in accordance with the invention.

The transformer, as shown in the drawing, is encased within a tank 1 and consists of a magnetic core 2 and a coil 3, both of which are supported in spaced relation from the bottom of the tank 1 by channel support members 4 or the like. The coil 3 comprises a high voltage winding 5 and a low voltage winding 6 which are insulated from one another by the treated cellulose insulation 7. A treated cellulose wrapping 8 may also be applied to the exterior of the coil 3. A dielectric liquid 9 comprising oil, chlorinated diphenyl, or the like is disposed within the tank 1 to cover the core 2 and the coil 3 in order to insulate them and to dissipate the heat generated during operation.

The cellulose insulating materials 7 and 8 may be composed of rag, kraft or manila paper or other cellulosic material, such as rayon or the like, and the fibrous material is impregnated with the combination of morpholine and pentaerythritol.

The active ingredients, morpholine and pentaerythritol, are preferably applied to the cellulose fibers in the form of an aqueous solution. The fibers can be impregnated in any suitable manner, such as by immersing the fibers in a treating solution for a time sufficient to fully impregnate the fibers. The fibers can also be impregnated by spraying, brushing, dipping, size press addition, or the like. It is important that all of the individual fibers or filaments of the cellulose material are impregnated with the treating solution, so that each individual cellulose fiber is able to react with the active ingredients. Impregnation differs from surface coating processes in which only the outer surface of the fibrous material is coated with the active ingredient, and the individual fibers on the interior of the material are generally uncoated.

The impregnation of the cellulose fiber materials can be carried out at room temperature or at elevated temperatures up to the boiling point of the solution employed. The time of contact between the cellulose fibers and the solution should be sufficient to permit substantial penetration or impregnation of the fibers. Generally, a contact time of 15 seconds to 10 minutes is adequate for impregnation, although longer treatment periods can be employed without adversely affecting the composition. While an aqueous treating solution is the most practical, other types of evaporable solvents or carriers can be substituted for water.

It has been found that the concentration of the active ingredients used in the treating solution may vary considerably depending on the end use of the cellulose material and the method of application. Although it is somewhat more difficult to achieve the desired impregnation from very dilute solutions as compared to more concentrated solutions, solutions containing as little as 0.5% active ingredients have been used. Generally, solutions containing from 2 to 10% active ingredients are used, with about 7.5% being preferred.

The weight relationship between the morpholine and the pentaerythritol is not particularly critical. It has been found that the morpholine can be used in the weight ratio of 1:5 to 5:1 with respect to the pentaerythritol.

After the treating solution has been applied to the cellulose material for the desired period of time to provide adequate impregnation, the excess solution is removed or drained from the cellulose and the cellulose is either dried at room temperature or at a suitable elevated temperature to evaporate the water or other carrier.

Generally, the greater the amount of active ingredients present, the more the cellulose fibers are stabilized. However, because the active ingredients may be used in varying proportions in the treating solution, it is difficult to provide a meaningful quantitative indication of the degree of stablization obtained. It has been found, however, that when the active ingredients are present in an amount of 0.7 to 100% by weight of the dried cellulose fiber materials, substantial improvement in the thermal stability of the fibers is obtained. This concentration of active ingredients in the dried product corresponds generally to 0.1 to 3.0% by weight of nitrogen.

The cellulose fibers treated with the combination of morpholine and pentaerythritol have greatly improved stability enabling the cellulose fiber material to withstand the deteriorating action of heat over extended periods of time. In addition, when the cellulose fiber product is to be used as an insulating material in an electrical apparatus and immersed in transformer oil or other dielectrics, it has been found that the treated cellulose paper will not discolor or deteriorate the transformer oil.

The following example illustrates the process of the invention:

Sheets of kraft paper 8" x 8" and 5 mils thick are immersed in aqueous solutions containing the active ingredients set forth in the table below. The sheets of paper were immersed in each treating solution until the paper was thoroughly soaked or impregnated and then allowed to air dry at room temperature. The impregnated sheets were then placed in glass tubes containing insulated copper wire 21" (16 gauge Formvar coated) and copper foil (14" x 1" x 2 mils). This paper copper system was placed in an oven at 135° C. for 16 hours. During this time a pressure of 0.1 mm. was maintained within the tube. At the end of this drying period the evacuated tubes containing the impregnated papers were filled under vacuum with an inhibited transformer oil, leaving an air space in each tube of approximately 15% of the total volume. The air space in each tube was then filled to one atomsphere pressure with dry air. The tubes were then sealed off with an oxygen gas torch.

The sealed glass tubes were placed in an oven at 170° C. Samples 2 and 3 were retained at this temperature for 120 hours, while Sample 4 was retained within the oven for 288 hours. The physical properties of the heat-aged paper, along with a non-aging control Sample No. 1, were tested and are shown in the following table:

|  | Sample No. | | | |
| --- | --- | --- | --- | --- |
|  | 1 | 2 | 3 | 4 |
| Wt. percent of morpholine in aqueous solution | 0 | 0 | 5.0 | 5.0 |
| Wt. percent of pentaerythritol in aqueous solution | 0 | 0 | 2.5 | 2.5 |
| Hours aged at 170° C | 0 | 120 | 120 | 288 |
| Tensile strength—lbs | 39.3 | 18.6 | 36.3 | 35.6 |
| Percent of original tensile strength retained | 100 | 47.3 | 92.2 | 91.0 |

From the above table, it can be seen that the control Sample No. 2, which was treated only with water without additives, and aged at 170° C. for 120 hours, retained only 47.3% of its original tensile strength after aging. In contrast to this, Sample No. 3, treated with morpholine and pentaerythritol and aged for 120 hours at 170° C., retained 92.2% of its original tensile strength, and Sample No. 4, which also was treated with morpholine and pentaerythritol and aged for 288 hours, retained 91.0% of its original tensile strength. This test indicates the definite imrovement in thermal stability in the cellulose material brought about by the use of morpholine and pentaerythritol.

Various modes of carrying out the invention are contemplated as being within the scope of the following claims particularly pointing out and distinctly claiming the subject matter which is regarded as the invention.

We claim:

1. A method of increasing the thermal stability of cellulose fiber material, comprising the steps of impregnating the cellulose fiber material with a mixture of morpholine and pentaerythritol to provide a dry fiber material having a nitrogen content in the range of 0.1 to 3% by weight, said morpholine being present in the weight ratio of 1:5 to 5:1 with respect to the pentaerythritol.

2. A method of increasing the thermal stability of cellulose fiber material, comprising the steps of impregnating the cellulose fibers with an aqueous solution of the mixture of morpholine and pentaerythritol with said morpholine being present in the weight ratio of 1:5 to 5:1 with respect to the pentaerythritol, and thereafter evaporating the water to provide a dried material in which said combination comprises from 0.7 to 100% by weight of said dried material.

3. A cellulose insulating material having improved thermal stability, comprising a cellulose fiber base impregnated with the mixture of morpholine and pentaerythritol with the morpholine being present in the weight ratio of 1:5 to 5:1 with respect to the pentaerythritol, said cellulose material containing from 0.1 to 3% by weight of nitrogen.

References Cited by the Examiner

UNITED STATES PATENTS 2,912,392 11/1959 Stilbert et al. _____ 117—36 XR
3,135,627 6/1964 Sadler _____ 252—63.7 XR JULIUS GREENWALD, *Primary Examiner.*

J. D. WELSH, *Assistant Examiner.*